United States Patent
Chi et al.

(10) Patent No.: US 9,519,340 B2
(45) Date of Patent: *Dec. 13, 2016

(54) WEARABLE WATCH-TYPE TERMINAL AND SYSTEM EQUIPPED WITH THE SAME

(71) Applicant: LG ELECTRONICS INC., Seoul (KR)

(72) Inventors: Jumin Chi, Seoul (KR); Jinwook Ro, Seoul (KR); Yeseul Jang, Seoul (KR); Inyong Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

This patent is subject to a terminal disclaimer.

(21) Appl. No.: 14/282,881

(22) Filed: May 20, 2014

(65) Prior Publication Data
US 2015/0061997 A1    Mar. 5, 2015

(30) Foreign Application Priority Data

Aug. 30, 2013    (KR) ........................ 10-2013-0104319

(51) Int. Cl.

| | |
|---|---|
| *G06F 3/00* | (2006.01) |
| *G06F 3/01* | (2006.01) |
| *G04G 21/00* | (2010.01) |
| *G06F 1/16* | (2006.01) |
| *F24C 7/08* | (2006.01) |
| *G08C 17/02* | (2006.01) |
| *G02B 27/01* | (2006.01) |

(52) U.S. Cl.
CPC .............. *G06F 3/005* (2013.01); *F24C 7/086* (2013.01); *G04G 21/00* (2013.01); *G06F 1/163* (2013.01); *G06F 3/014* (2013.01); *G08C 17/02* (2013.01); *G02B 2027/0178* (2013.01); *G08C 2201/40* (2013.01)

(58) Field of Classification Search
CPC ......... G04G 21/00; G06F 3/005; G02B 27/01; G02B 2027/01; G02B 2027/0178; F24C 7/086
USPC .................................................. 345/173–175
See application file for complete search history.

(56) References Cited

U.S. PATENT DOCUMENTS

| | | | |
|---|---|---|---|
| 6,556,222 B1 * | 4/2003 | Narayanaswami .. | G04G 9/0064 368/295 |
| 2006/0225442 A1 * | 10/2006 | Baldino ................. | B41J 3/4075 62/125 |
| 2012/0003364 A1 * | 1/2012 | Kling ........................ | F24C 7/08 426/231 |
| 2012/0099255 A1 * | 4/2012 | Lee ........................ | F25D 25/025 361/679.01 |
| 2013/0016033 A1 * | 1/2013 | Latta ....................... | G06F 3/011 345/8 |

(Continued)

*Primary Examiner* — Sanjiv D Patel
(74) *Attorney, Agent, or Firm* — Birch, Stewart, Kolasch & Birch, LLP

(57) ABSTRACT

A mobile terminal including a main body configured to be worn on a user's wrist; a wireless communication unit configured to wirelessly communicate with a glasses-type terminal worn by the user, said glasses-type terminal including a camera configured to capture an image including operational data for operating an external apparatus; and a controller configured to receive including the operational data from the glasses-type terminal, store the operational data in a memory associated with the mobile terminal, and transmit a control signal to the external apparatus to control the external apparatus according to the stored operational data.

19 Claims, 15 Drawing Sheets

(56) References Cited

U.S. PATENT DOCUMENTS

| | | | |
|---|---|---|---|
| 2013/0050069 A1* | 2/2013 | Ota | G06F 3/011 |
| | | | 345/156 |
| 2013/0050258 A1* | 2/2013 | Liu | G06T 19/006 |
| | | | 345/633 |
| 2013/0069985 A1* | 3/2013 | Wong | G02B 27/017 |
| | | | 345/633 |
| 2013/0127980 A1 | 5/2013 | Haddick et al. | |
| 2013/0147686 A1 | 6/2013 | Clavin et al. | |
| 2014/0282144 A1* | 9/2014 | Maciocci | G06F 3/0481 |
| | | | 715/765 |

* cited by examiner

WEARABLE WATCH-TYPE TERMINAL AND SYSTEM EQUIPPED WITH THE SAME

CROSS-REFERENCE TO RELATED APPLICATION

Pursuant to 35 U.S.C. §119(a), this application claims the benefit of earlier filing date and right of priority to Korean Application No. 10-2013-0104319, filed on Aug. 30, 2013, the contents of which is incorporated by reference herein in its entirety.

BACKGROUND OF THE INVENTION

1. Field of the Invention

The present invention relates to a watch-type terminal for controlling an external apparatus using obtained information and a system equipped with the watch-type terminal.

2. Background of the Invention

A mobile terminal includes one or more functions such as performing voice and video call communications, inputting and outputting information, storing data, and the like.

As functions of the terminal become more diversified, the terminal can support more complicated functions such as capturing images or video, reproducing music or video files, playing games and receiving broadcast signals. Thus, the mobile terminal may be embodied in the form of a multimedia player or a device.

Some data stored in a terminal can be shared with an electronic apparatus through a connection between them. However, the interface between the terminal and electronic apparatus is complicated and difficult for the user to use.

SUMMARY OF THE INVENTION

Therefore, an aspect of the detailed description is to provide a system for easily obtaining information applied to an external apparatus and for controlling the external apparatus without any input.

To achieve these and other advantages and in accordance with the purpose of this specification, as embodied and broadly described herein, there is provided a glasses-type terminal including: a main body that is able to be fixed to a user's wrist; a wireless communication unit that is connected to a glasses-type terminal that obtains data that includes information on an external apparatus which is applied to the external apparatus and time information on how long an external apparatus operates and that receives the data from the glasses-type terminal; a memory in which the received data is stored; a display unit to which the time information included in the received data is output; and a controller that, by using the information on the external apparatus included in the data, controls the wireless communication unit so an operation control signal for operating the external operation according to the time information is transmitted to the external apparatus along with the data.

In the glasses-type terminal, the main body may include a housing that support the display unit, a fixation portion that is connected to the housing and that is formed so to surround the users wrist, and a user input unit that receives a control command associated with the users external apparatus.

In the glasses-type terminal, the user input unit may be arranged in an edge of the housing and may include a wheel structure that is formed so to rotate with application of pressure, and the controller can change the time information, based on the control command applied to the wheel structure.

In the glasses-type terminal, the user input unit may include a touch sensing sensor that receives a user's input unit applied to one region of the fixation portion, and based on the user's touch input, the controller can control the wireless communication unit so according to the information on the external apparatus, an operation signal for operating the external apparatus is transmitted, the information is deleted, or an operation stopping signal is transmitted.

In the glasses-type terminal, if the external apparatus and the main body are arranged adjacent to each other, the operation control signal may correspond to a signal for immediately operating the external apparatus.

In the glasses-type terminal, current hour-and-minute may be displayed on the display unit, and when the external apparatus operates, the controller can control the display unit so progress information on the external apparatus is output to the display unit.

In the glasses-type terminal, the operation information may include an icon corresponding to the external apparatus and remaining time for which the external apparatus has to operate.

To achieve these and other advantages and in accordance with the purpose of this specification, as embodied and broadly described herein, there is provided a control system including: a glasses-type terminal which includes a display unit which is mounted on a user's face and to which screen is output and a camera that obtains information on an external apparatus; a watch-type terminal that is mounted on a user's wrist, displays current hour-and-minute, and wirelessly communicates with the glasses-type terminal to receive the information; and the external apparatus that is configured so when wirelessly communicating with the watch-type terminal, the external apparatus receives the information and operates based on the information.

In the control system, the glasses-type terminal may extract an image that is obtained by the camera, the information on the external apparatus, and operation time information on the external apparatus.

In the control system, the extracted information and the extracted operation time information may be output on the display unit.

In the control system, when the external operation operates, operation status of the external apparatus may be output to the external apparatus.

In the control system, if the watch-type terminal is detected by the camera, the glass-type terminal may transmit the information and the operation time information to the watch-type terminal and the watch-type terminal and may receive and store the information and the operation time.

In the control system, the watch-type terminal may be detected by the camera, and the glasses-type terminal may transmit the information and the operation time information to the watch-type terminal, based on a voice command applied to the glasses-type terminal.

In the control system, when the watch-type terminal is arranged adjacent to the external apparatus, the watch-type terminal may wirelessly communicate with the external apparatus and the external apparatus may receive the information and the operation time information from the watch-type terminal and operate based on the operation time information.

In the control system, the external apparatus may store the information and the operation time information, and if the external apparatus is in an inactivated state, the external apparatus may be activated based on the operation time information.

In the control system, the information on the external apparatus may include information on an object that the external, apparatus performs processing on.

In the control system, the watch-type terminal may further include a user input unit that receives a user's control command, and when the control command is input, based on the information, the watch-type terminal may start to operate or stop operating.

In the control system, while the external apparatus operates, the camera may obtain the information, and if the external apparatus is in an inactivated state, the external apparatus may be activated back based on the information.

According to an embodiment of the present invention, the data relating to the external apparatus is automatically obtained, by the glasses-type terminal, from the captured image and is more easily transferred to the watch-type terminal. In addition, by using the watch-type terminal including the operation data, the operation data is more easily transferred to the external apparatus and thus the external apparatus operates.

Accordingly, the necessary information is obtained without fail, and the right external apparatus operates based on the operation data without memorizing or storing the necessary information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail according to the embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the embodiments of this specification can be applied to stationary terminals such as digital TV, desktop computers and the like excluding a case of being applicable only to the mobile terminals.

Figure 1:
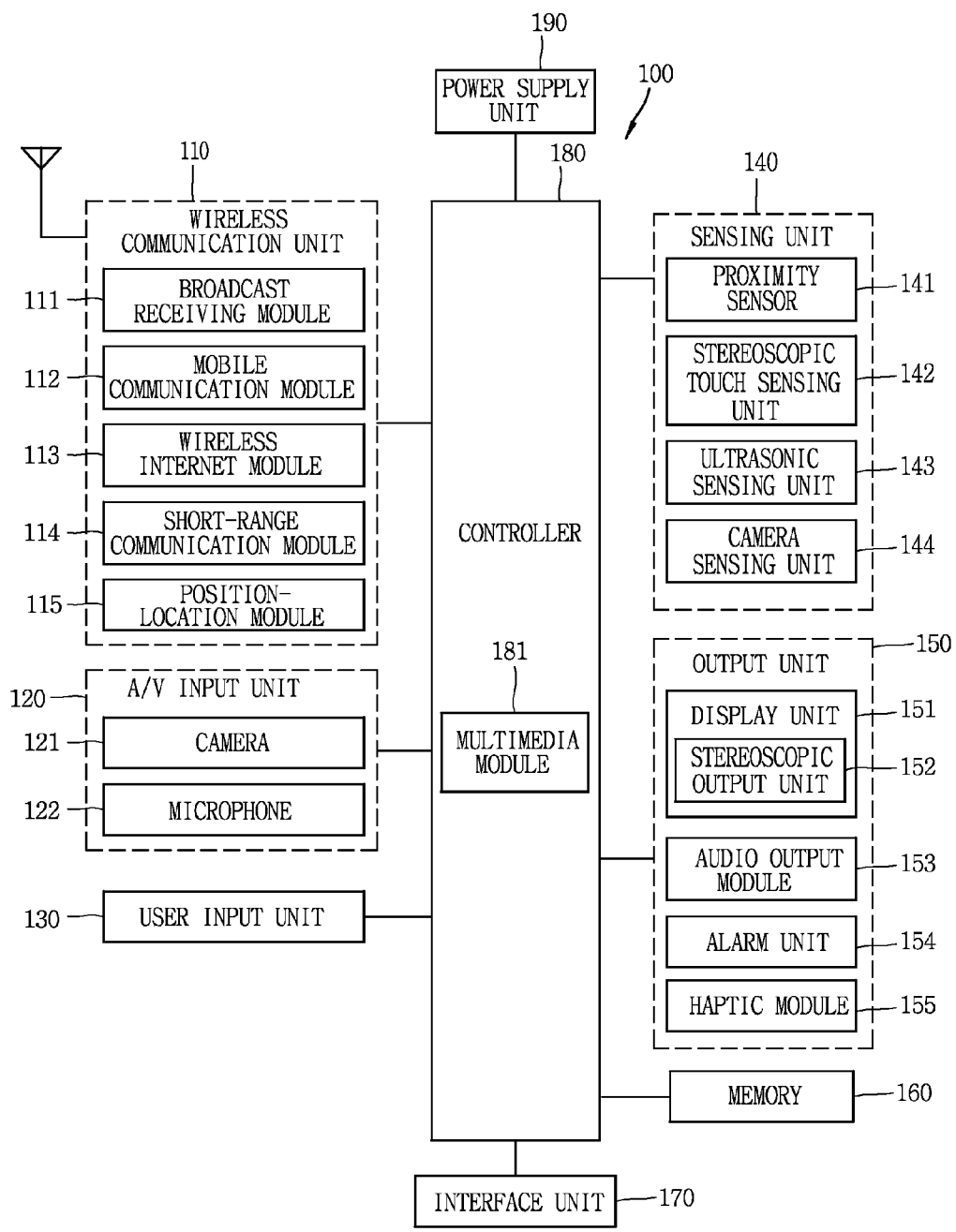
FIG. 1 is a block diagram illustrating a terminal according to one embodiment of the present invention.

FIG. 1 is a block diagram of a mobile terminal 100 in accordance with one embodiment. The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but implementing all of the illustrated components is not a requirement. Greater or fewer components may alternatively be implemented.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Further, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a wireless fidelity (WiFi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 for the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151 (including a stereoscopic output unit 152), an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces. The display unit 151 may also be implemented as a stereoscopic display unit 152 for displaying stereoscopic images.

Further, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

In addition, a left image and a right image required for implementing a 3D stereoscopic image is displayed on the stereoscopic display unit 152 by a stereoscopic processing unit. The stereoscopic processing unit may receive the 3D image and extract the left image and the right image, or may receive the 2D image and change it into a left image and a right image.

Further, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151 into electric input signals. Also, the touch sensor may be configured to sense not only a touched position and a touched area, but also touch pressure. Further, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 can sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of the camera 121, a photo sensor, and a laser sensor. For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also output via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UN), a subscriber identity module (SIM) a universal subscriber identity module (USN), and the like. In addition, the device having the identification module (referred to as identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 can include a multimedia module 181 for reproducing multimedia data. The multimedia module 181 may be configured within the controller 180 or may be configured to be separated from the controller 180.

The controller 180 can perform a pattern recognition processing to recognize a handwriting input or a picture drawing input performed on the touch screen as characters or images, respectively.

Also, the controller 180 can execute a lock state to restrict a user from inputting control commands for applications when a state of the mobile terminal meets a preset condition. Also, the controller 180 can control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented by the controller 180 itself.

For a software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
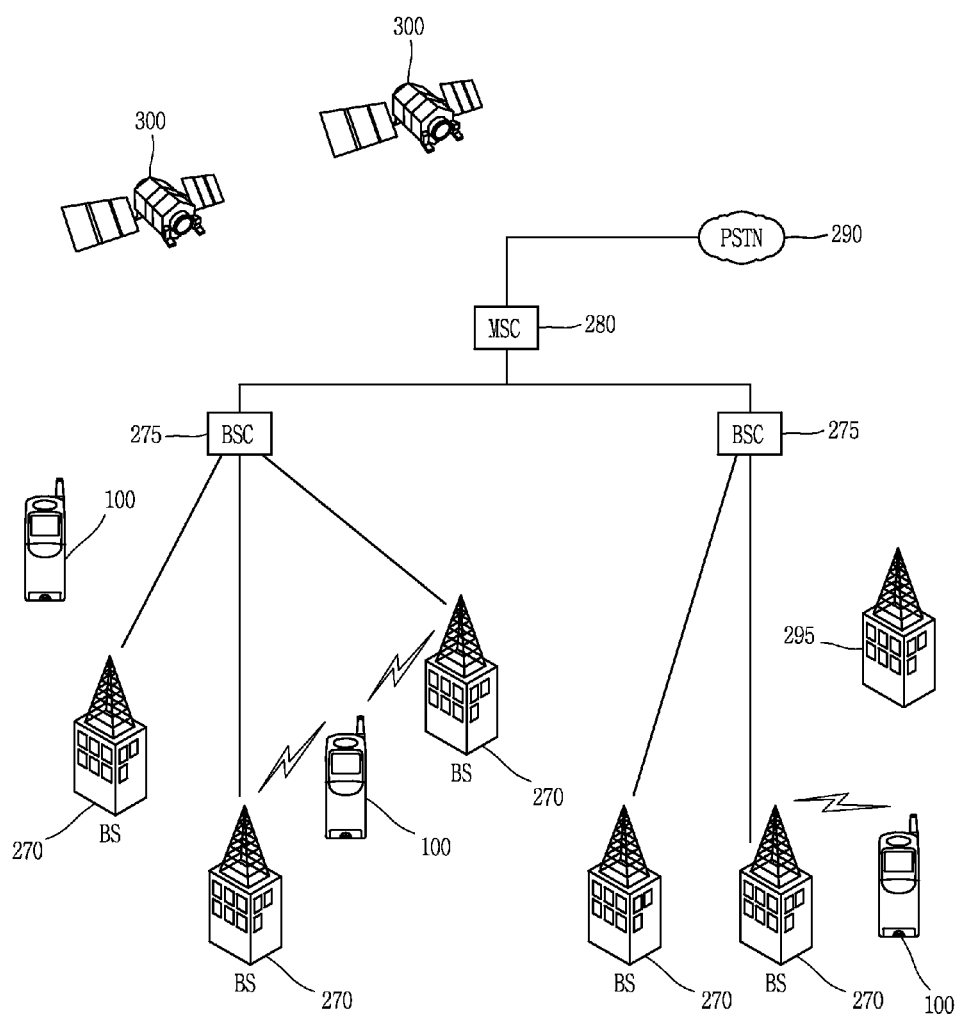
FIGS. 2A and 2B are a diagram of a communication system in which the terminal according to an embodiment of the present invention can operate.
Figure 2B:
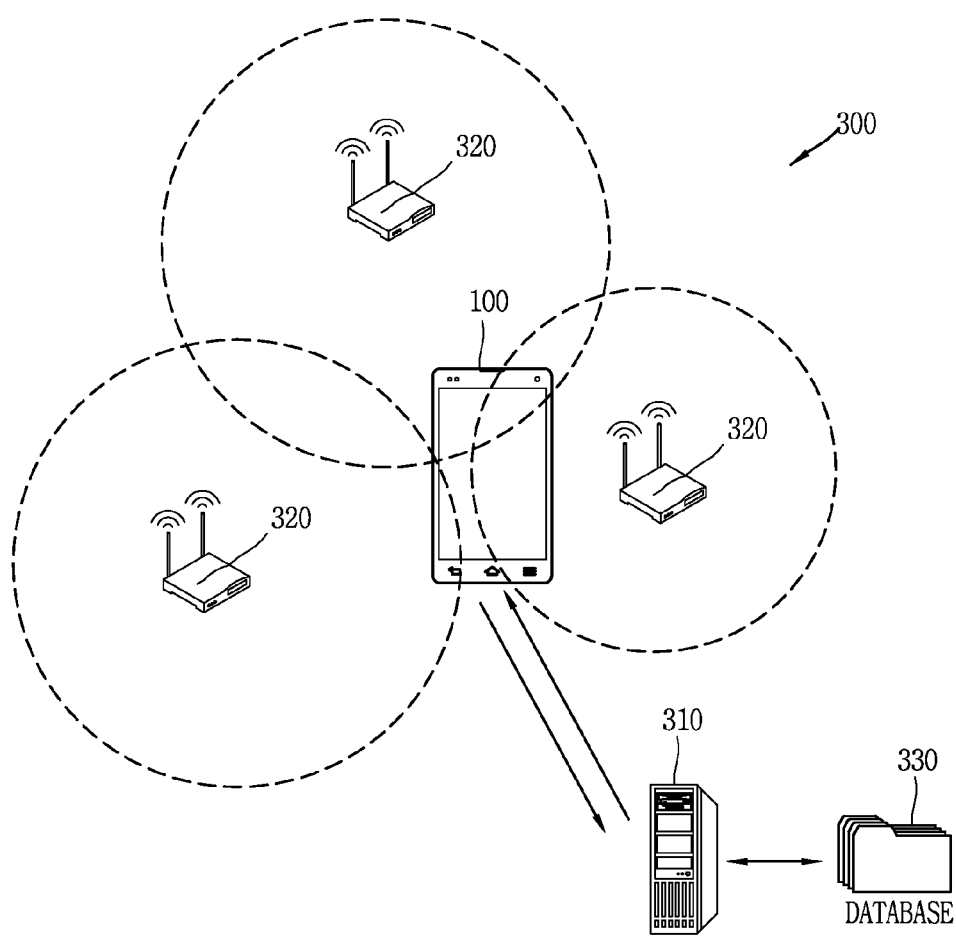

Hereinafter, a communication system which is operable with the mobile terminal 100 according to the present invention will be described. FIGS. 2A and 2B are conceptual views of a communication system operable with a mobile terminal 100 in accordance with the present invention.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (COMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the COMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2A, but useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

In addition, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330. The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owners address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3:
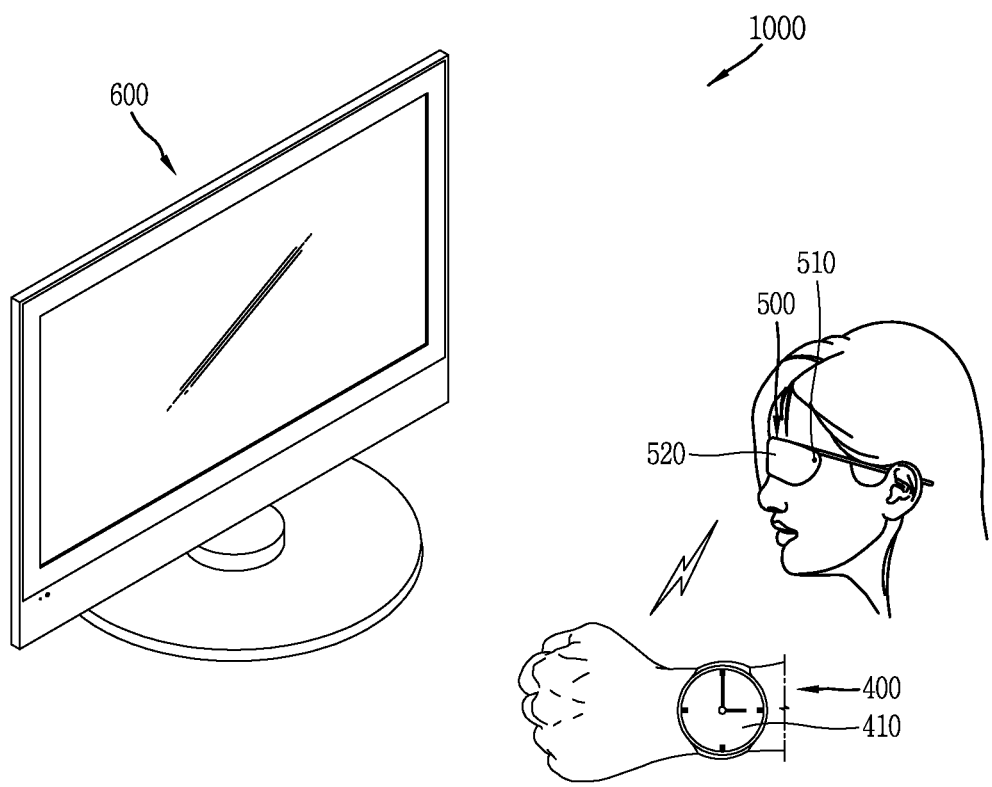
FIG. 3 is a diagram illustrating a configuration of a system according to an embodiment of the present invention.
Figure 4:
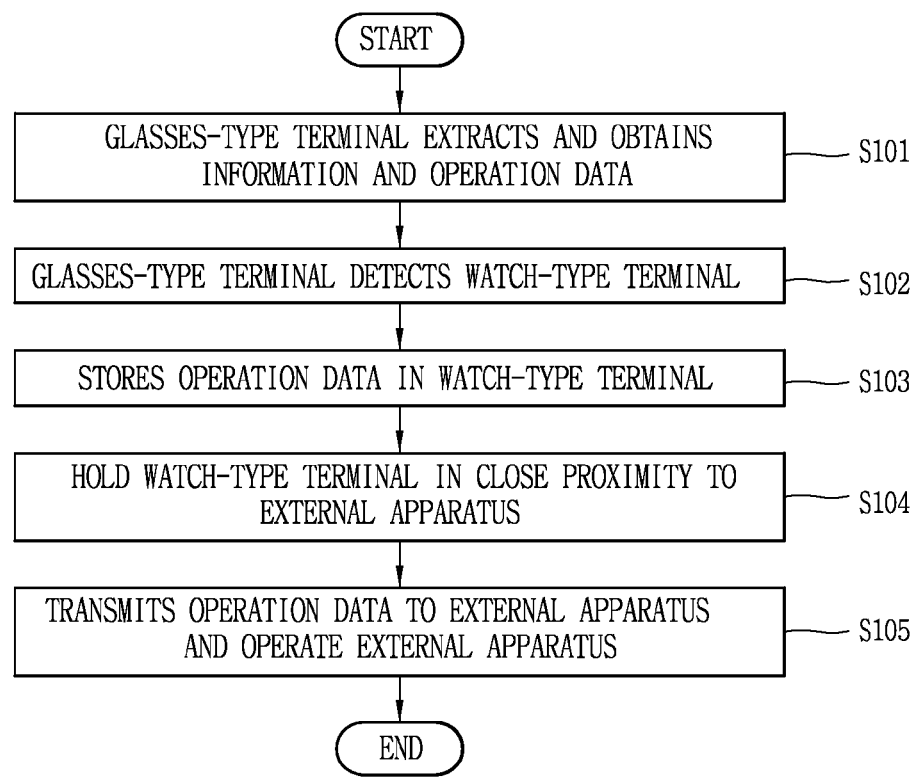
FIG. 4 is a flowchart illustrating a method of controlling the terminal according to one embodiment of the present invention.

Next, FIG. 3 is a diagram illustrating a configuration of a system according to an embodiment of the present invention; and FIG. 4 is a flowchart illustrating a method of controlling the terminal according to one embodiment of the present invention.

Referring to FIG. 3, the system 1000 includes a watch-type terminal 400, a glasses-type terminal 500, and an external apparatus 600. The watch-type terminal 400 and the glasses-type terminal 500 are worn by the user and are wirelessly connected with each other. For example, when they are positioned within a predetermined distance from each other, the watch-type terminal 400 and the glasses-type terminal can wirelessly transceive between them. That is, while the user wears the glasses-type terminal 500 and the watch-type terminal 400, a wireless connection can be established between them.

In addition, if they are worn by the user, the glasses-type terminal 500 and the watch-type terminal 400 are connected to each other after going through a process for authenticating the user of each terminal. In addition, the user wears the glasses-type terminal 500 on his/her face. The glasses-type terminal 500 includes a display unit 520 and a camera 510. The camera 510 is configured to photograph an external environment that appears outside of the glasses-type terminal 500. While the user wears the glasses-type terminal 500, the camera 510 is controlled so it continues to operate. In addition, the user can recognize hour-and-minute data that is output to the display unit 520.

Further, the user wears the watch-type terminal 400 on his/her wrist. The watch-type terminal 400 includes a display unit 410 that provides the user with current time information. For example, the display unit 410 outputs not only current hour-and-minute, but also different hour-and-minute data that is set by the user. In addition, the display unit 410 further includes a touch sensing sensor that senses a user's touch input.

The system according to an embodiment of the present invention further includes the external apparatus 600 that can be controlled using the glasses-type terminal 500 and the watch-type terminal 400 wirelessly connected to each other. There is no limit to a type of the external apparatus 600 and examples of the external apparatus are household electric appliances. That is, the external apparatus 600 corresponds to a washing machine, a microwave oven, a TV set, etc.

The external apparatus 600 is wirelessly connected to the watch-type terminal 400. For example, if the watch-type terminal 400 is positioned close to the external apparatus 600, the external apparatus 600 detects this and thus is wirelessly connected to the watch-type terminal 400 and receives the wireless signal from the watch-type terminal 400. For example, the external apparatus 600 is wirelessly connected to the watch-type terminal 400 through a Bluetooth (BT) wireless connection or an NFC wireless connection, but is not limited to these wireless connection technologies. The external apparatus 600 may receive the wireless signal from the watch-type terminal 400 through other wireless connection technologies (Wireless Lan and WiFi).

Referring to FIG. 4, information is obtained by the glasses-type terminal 500 (S101). As described above, the camera 510 of the glasses-type terminal 500 is controlled to photograph the external environment. The glasses-type terminal 500 extracts information from an image obtained in real time by the camera 510 based on a predetermined reference and outputs the extracted information to the display unit.

For example, the information included in the image corresponds to operation time information on the external apparatus, setting information for driving the external apparatus, information on an object applied to the external apparatus or the like. If information on the operation time is included in the image obtained by the camera, the glasses-type terminal 500 extracts data including the operation time information and outputs the extracted data to the display unit 520.

Figure 5A:
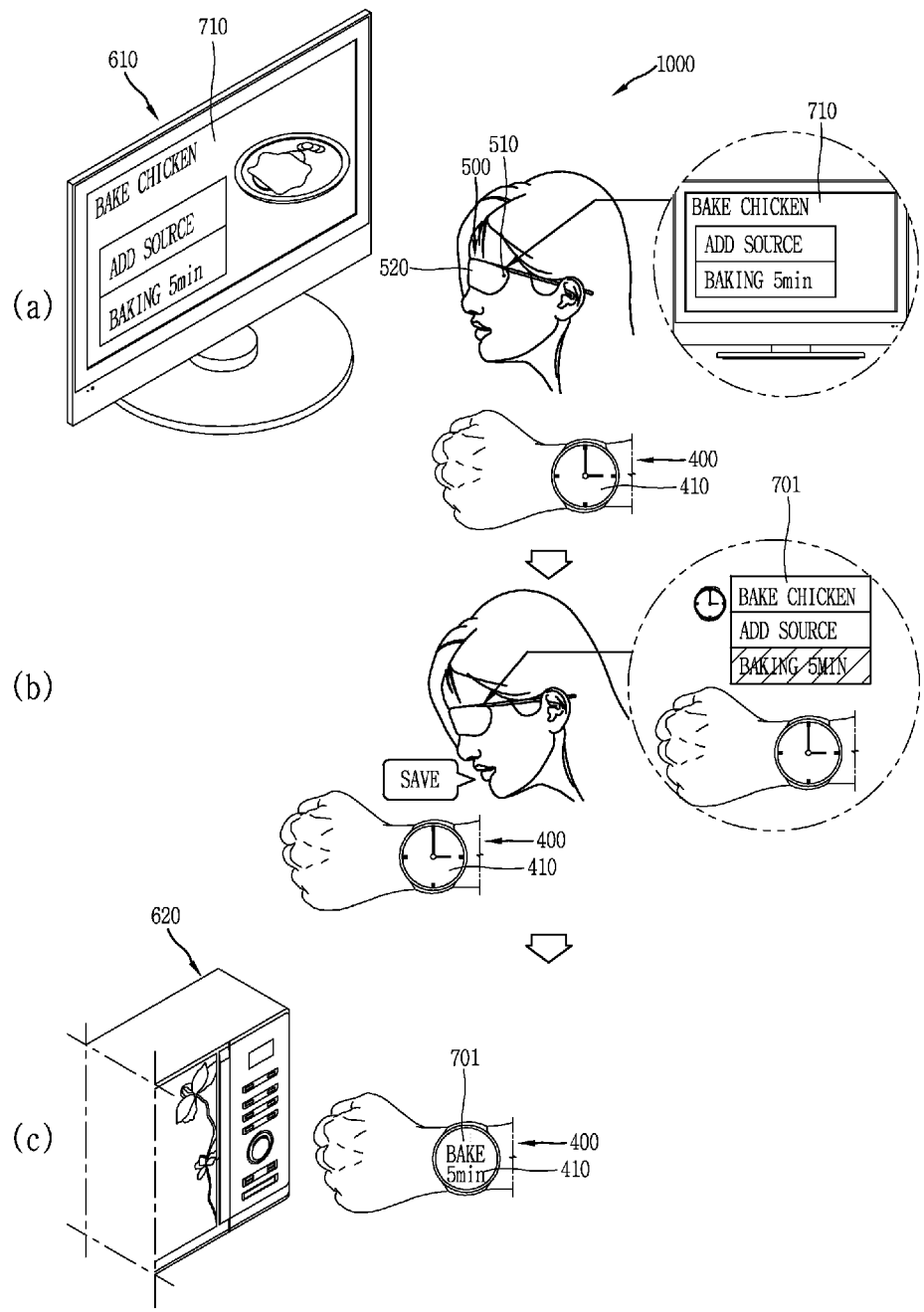
FIGS. 5A and 5B are diagrams illustrating the control method according to one embodiment of the present invention in FIG. 4.

Referring to FIG. 5A(a), the camera 510 images hour-and-minute data 710 that is output from a first external apparatus 610. The glasses-type terminal 500 extracts the operation time information (BAKING 5 min) included in the hour-and-minute data 710 and outputs the operation data 710 including the operation time information to the display unit 520.

The display unit 520 transparently outputs the operation data 710 so the user can continually detect the external environment. When the watch-type terminal 400 is detected by the glasses-type terminal 500 (S102), the watch-type terminal 400 stores the operation data 701 (S103). That is, based on a movement of a user's gaze, the camera 510 of the glasses-type terminal 500 detects the watch-type terminal 400.

As shown in FIG. 5A(b), when the watch-type terminal 400 is detected for a predetermined time (several seconds), the glasses-type terminal 500 transmits the operation data 701 to the watch-type terminal 400. Alternately, when a predetermined control command is applied to the glasses-type terminal 500, the glasses-type terminal 500 transmits the operation data 701.

For example, as shown in the example in FIG. 5A(b), when a microphone is included in the glasses-type terminal 500, the glasses-type terminal 500 detects a user's voice command (store) and transmits the operation data 701. Alternatively, when a sensor sensing a movement is included in the glasses-type terminal 500, the sensor senses rocking of the glasses-type terminal 500 due to the movement of the user's gaze and transmits the operation data 701.

There is no limit to a type of the external apparatus associated with the operation data 701. For example, if a cooking recipe is detected by the camera 510 and operation time data on the microwave oven is extracted, the glasses-type terminal 500 transmits at least one portion of the recipe to the watch-type terminal 400. The operation data 701 includes contents of the type of the external apparatus to which the operation data 701 is to be applied.

The watch-type terminal 400 further includes a memory in which the received operation data 701 is stored. In addition, after the operation data 701 is transmitted to the watch-type terminal 400, the display unit 520 of the glasses-type terminal 500 outputs the operation data 701 continuously or interrupts the outputting.

When receiving the operation data 701, the display unit 410 of the watch-type terminal 400 outputs the operation data 701. Further, the display unit 410 of the watch-type terminal 400 manipulates the received operation data 701, and outputs an image of the external apparatus corresponding to the operation data 701 and time for which the external apparatus operates.

As shown in FIG. 5A(c), when the watch-type terminal 400 is held in close proximity to an external apparatus 620 (S104), the operation data is transmitted to the external apparatus 620 and thus the external apparatus operates (S105). In addition, the holding of the watch-type terminal 400 in close proximity to the external apparatus 620 activates, the external apparatus 620 so the external apparatus 620 recognizes the watch-type terminal 400 and thus the watch-type terminal 400 transmits the information to the external apparatus 620.

For example, the user can position the watch-type terminal 400 close to the external apparatus 620 and thus cause the external apparatus 620 to recognize the watch-type terminal 400 and establish a wireless connection between the external apparatus 620 and the watch-type terminal 400.

When wirelessly connected to the external apparatus 620 corresponding to the operation data 701, the watch-type terminal 400 transmits the operation data 701 to the external apparatus 620. In addition, based on the user's control command applied to the watch-type terminal 400, the operation data 701 is transmitted to the external apparatus 620.

The watch-type terminal 400 transmits an operation control signal for the external apparatus 620 along with the operation data 701. When receiving the operation control signal, the external apparatus 620 is activated based on the operation data 701.

As illustrated in the drawings, the operation data 701 includes information on three-minute backing operation. When receiving the operation data 701, the external apparatus 620 performs baking operation for three minutes. Further, when the operation data 701 is transmitted to the external apparatus 620, the display unit 410 of the watch-type terminal 400 limits the outputting of the operation data 701. That is, the display unit 410 outputs back screen information indicating current hour-and-minute.

That is, the data relating to the external apparatus is automatically obtained, by the glasses-type terminal 500, from the captured image and is more easily transferred to the watch-type terminal 400. In addition, by using the watch-type terminal including the operation data, the operation data 701 is more easily transferred to the external apparatus 620 and thus the external apparatus 620 operates. Accordingly, useful information is obtained, and the right external apparatus operates based on the operation data without memorizing or storing the necessary information.

Figure 5B:
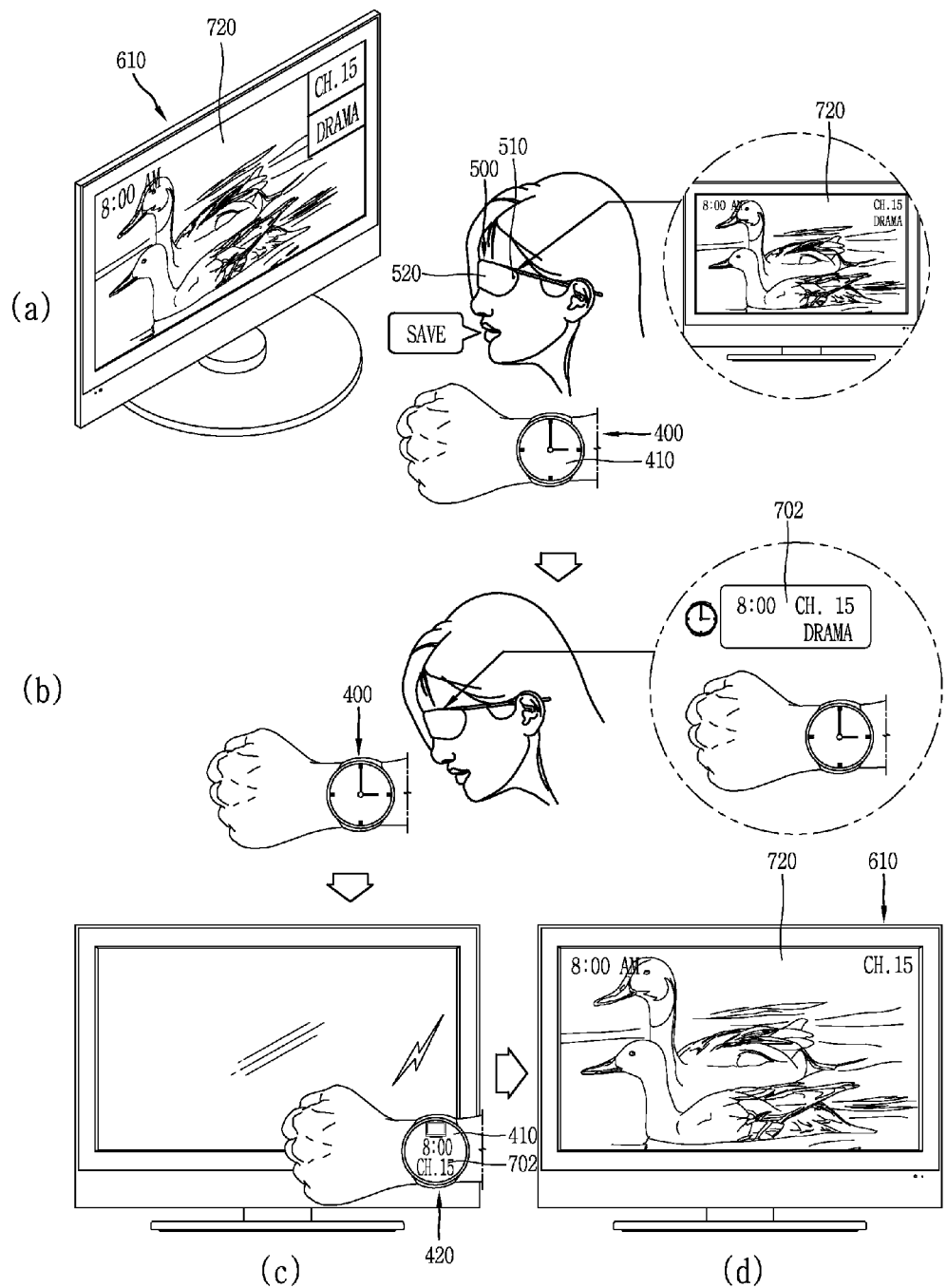

Referring to FIGS. 5B(a) to 5B(d), a method is described in which the system is controlled when a source of the operation data and the external apparatuses to which to transmit the operation data are the same.

Referring to 5B(a) to 5B(d), the user can recognize the first external apparatus 610, and the camera 510 of the glasses-type terminal 500 detects the first external apparatus 610 and the screen information output from the first external apparatus 610. When time information that is included in screen information 720 is detected, the glasses-type terminal 500 memorizes one portion of the screen information 720 and outputs the one portion to the display unit 520.

The user can recognize the operation data that is output to the display unit 520 and can input a control command (for example, the user's voice command (store) for storing the operation data. The glasses-type terminal 500 (temporarily) stores the operation data 702, based on the control command.

For example, operation data 702 according to the present embodiment includes operation hour-and-minute information (8:00), a channel (CH. 15), and a type (DRAMA) of the screen information 720 that is to be output by an external apparatus 610. The operation data 702 is output to the display unit 520 of the glasses-type terminal 500.

In addition, the glasses-type terminal 500 grasps a category or a type of the screen information 720, and makes the category or the type included in the operation data 701. When the watch-type terminal 400 is detected by the camera 510, based on a change in the user's gaze, the operation data 702 is transferred from the glasses-type terminal 500 to the watch-type terminal 400.

A description of a method of transferring the operation data 701 from the glasses-type terminal 500 to the watch-type terminal 400 is similar as the one provided referring to FIGS. 5A(a) to 5A(c) and thus is omitted. When the operation data 702 is transmitted to the watch-type terminal 400, the watch-type terminal 400 outputs the operation data 702 to the display unit 410.

When the watch-type terminal 400 is held in close proximity to the external apparatus 610, the external apparatus 610 operates based on the operation data 702. For example, when the external apparatus 610 is powered off, and when the watch-type terminal 400 is held in dose proximity to the external apparatus 610, the external apparatus 610 is powered-on based on the operation data 702.

In addition, if the operation hour-and-minute information is included in the operation data 702, the external apparatus 610 that receives the operation data 702 is turned on at the hour-and-minute in accordance with the operation time information so the external apparatus tunes to a channel included in the operation data 702.

As described referring to FIG. 5B, the external apparatus that receives the operation data immediately operates, but is not limited to this. That is, the external apparatus 620 may operate based on operation hour-and-minute that is included in the operation data 702. In addition, if the external apparatus 610 operates using a different method, when the external apparatus 610 receives the operation data, the external apparatus 610 operates at the hour-and-minute included in the operation data, based on the information included in the operation data.

That is, according to an embodiment of the present system, the time information included in the operation data corresponds to a time section during which the external apparatus operates, and the hour-and-minute information included in the operation data means hour-and-minute at which the external apparatus is to operate.

In addition, the time information included in the operation data corresponds to a time section during which the external apparatus operates, and the hour-and-minute information included in the operation data corresponds to an hour-and-minute at which the external apparatus is to operate.

That is, according to the present embodiment, the operation data that is extracted from substantially the same external apparatus is transmitted back to the same external apparatus. In addition, because the operation data includes the hour-and-minute information, the external apparatus is controlled in a desired way without the need to apply the control command at the transferred hour-and-minute. In this instance, there is no need to hold the watch-type terminal in close proximity to the external apparatus at the hour-and-minute which the external apparatus has to operate.

Figure 6:
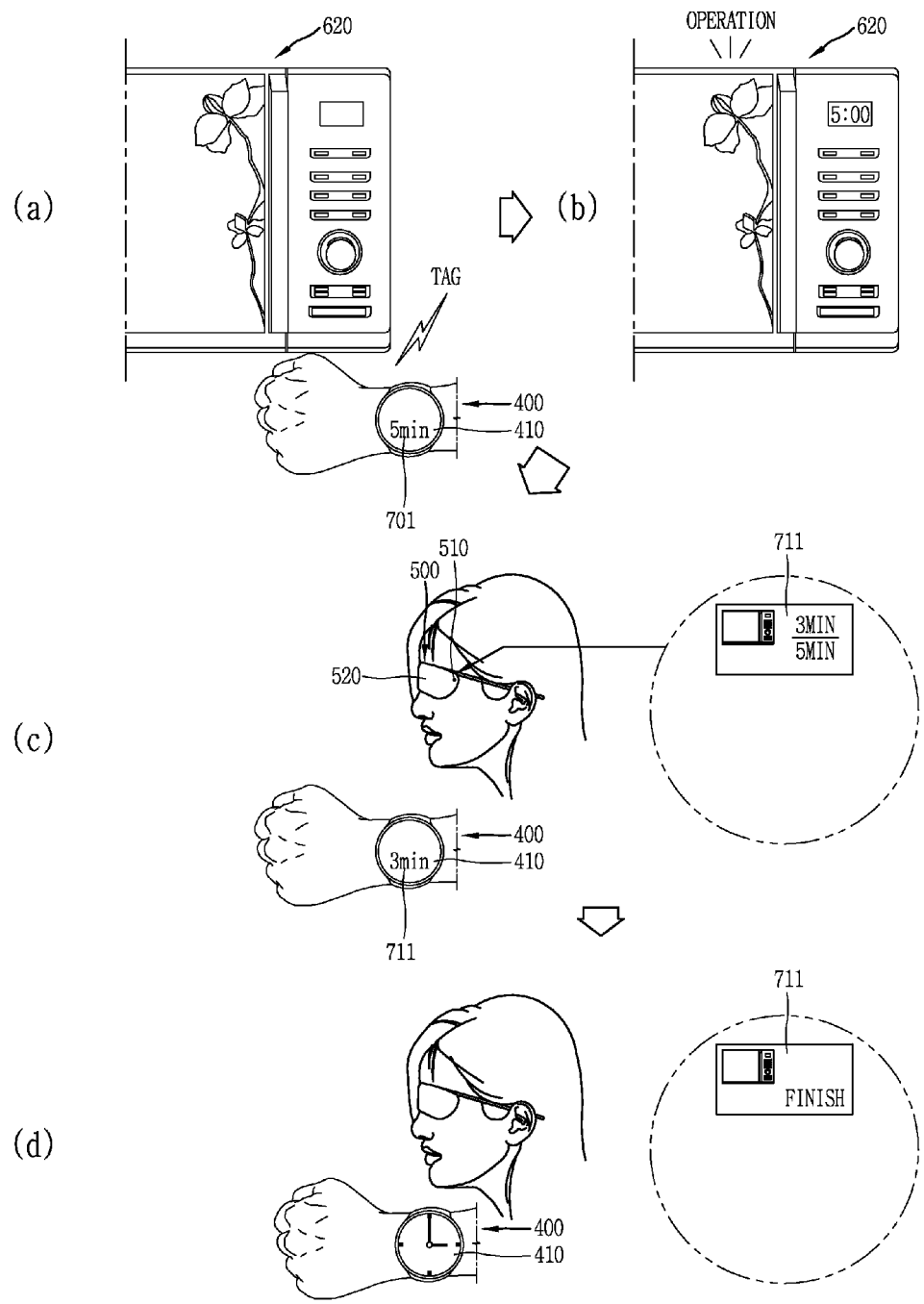
FIG. 6 is diagram illustrating a control method that provides progress information while an external apparatus operates.

Next, FIG. 6 is diagram illustrating a control method that provides progress information while the external apparatus 620 operates. In particular, FIGS. 6(*a*) and (*b*) illustrate holding the watch-type terminal 400 in close proximity to the second external apparatus 620 in which the operation data 701 is stored in the watch-type terminal 400. The second external apparatus 620 operates using the operation data 701 that is received from the watch-type terminal 400.

Referring to FIG. 6(*c*), the display unit 520 of the glasses-type terminal 500 outputs the progress information 711 on the second external apparatus 620. For example, the progress information 711 includes the image indicating the second external apparatus 620 and the remaining time for which the second external apparatus 620 has to operate. In addition, the progress information 711 is output also to the display unit 410 of the watch-type terminal 400.

Accordingly, the user can grasp an operation status of the external apparatus 620 in real time while the external apparatus 620 operates. The second external apparatus 620 transmits the progress information in real time to the glasses-type terminal 500 and the watch-type terminal 400, but is not limited to this. When the second external apparatus 620 operates by the watch-type terminal 400, the watch-type terminal 400 independently calculates the remaining operation time using the operation data 701 and transmits the calculated remaining operation time to the glasses-type terminal 500.

As shown in FIG. 6(*d*), when the operation of the second external apparatus 620 is finished, the progress information 711 indicating the ending of the operation is output to the display unit 520 of the glasses-type terminal 500. In addition, the progress or process information 711 is switched to the screen information indicating time on the display unit 410 of the watch-type terminal 400.

In addition, after a predetermined time elapses, the process information 711 disappears from the display unit 520 of the glasses-type terminal 500. Accordingly, the user can easily see or check the operation status even though he/she cannot check the status of the external apparatus.

Figure 7:
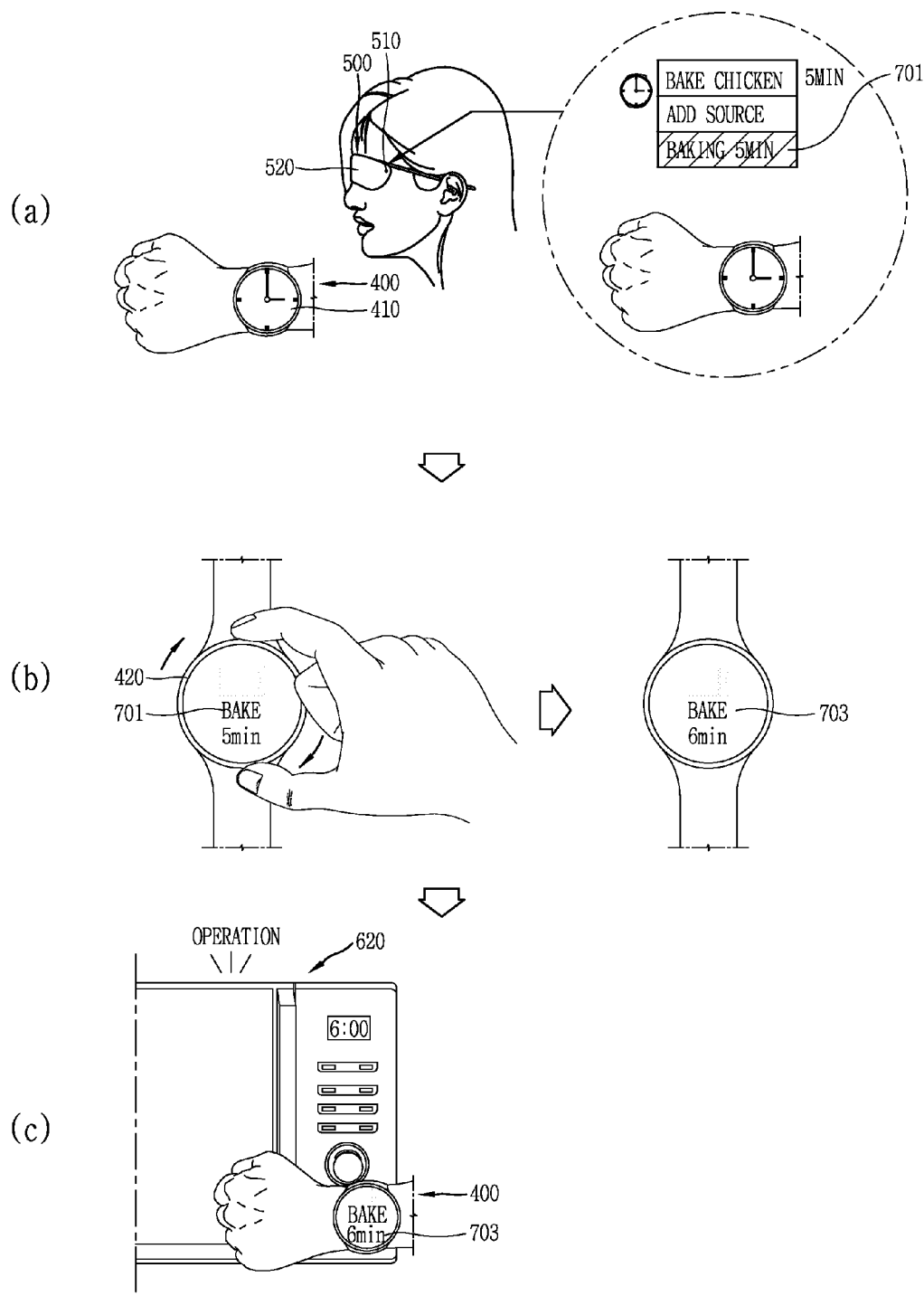
FIG. 7 is diagram illustrating a change of operation time using a watch-type terminal.

Next, FIGS. 7(*a*) to 7(*c*) are diagrams illustrating a change of the operation time using the watch-type terminal 400. Referring to FIG. 7(*a*), the operation data 701 that is output to the display unit 520 of the glasses-type terminal 500 is transmitted to the watch-type terminal 400 according to the detection of the watch-type terminal 400 by the camera 510.

Referring to FIG. 7(*b*), a main body of the watch-type terminal 400, which makes up an external appearance of the watch-type terminal 400, includes a housing that supports the display unit 410 and a fixation portion that is formed so it is fixed to a user's wrist. The watch-type terminal 400 according to the present embodiment includes a first user input unit 420 that receives the users control command.

The first user input unit 420 is formed on an edge of the housing, so to have a wheel structure in which the first user input unit 420 rotates with application of pressure. However, a structure for receiving the user's control command is not limited to the wheel structure.

The watch-type terminal 400 may be used to change the operation data 701, based on the user's control command applied to the first user input unit 420. For example, the user can change the time information that is included in the operation data 701, by rotating the first user input unit 420. The operation data 703 that results from changing the time information is output to the display unit 410 of the watch-type terminal 400.

As shown in FIG. 7(*c*), the watch-type terminal 400 stores the resulting operation data 703, and when held in close proximity to the second external apparatus 620, the watch-type terminal 400 transmits the resulting operation data 703 to the second external apparatus 620. Accordingly, the user can operate the external apparatus by changing the obtained information.

Figure 8A:
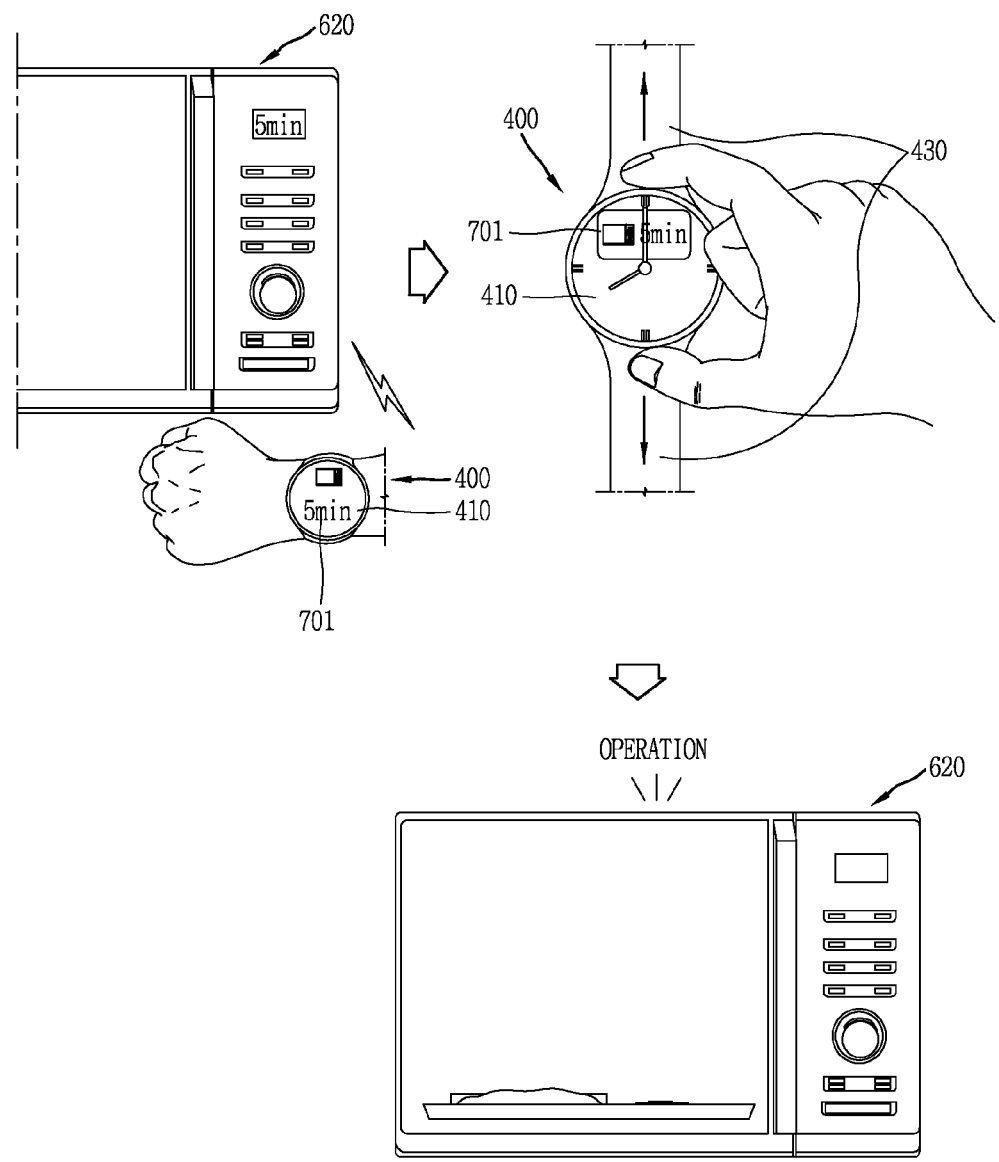
FIGS. 8A, 8B, 8C and 8D are diagrams illustrating a method of controlling an external apparatus using a user input unit of the watch-type terminal.

Next, FIGS. 8A-8D are diagrams illustrating a method of controlling the external apparatus using the user input unit of the watch-type terminal. Referring to FIG. 8A, the watch-type terminal 400 includes a second user input 430 that receives the user's touch input. For example, the second user input 430 is formed on the fixation portion (a watch strap) that is formed so it can be fixed to the user's wrist.

When the watch-type terminal 400 is held in close proximity to the second external apparatus 620, the operation data 701 is transmitted to the second external apparatus 620. However, the second external apparatus 620 stores the operation data 701, but does not operate.

Rather, the watch-type terminal 400 operates the second external apparatus 620, based on a touch input applied to the second user input 430. The second user input 430 is configured as the touch sensing sensor that senses the user's touch input. For example, the touch sensing sensor is configured so it is extended to a predetermined length from the display unit 410.

When the watch-type terminal 400 is held in close proximity to the second external apparatus 620 and then receives the touch input applied to the second user input 430 in a direction in which the touch input goes away from the display unit 410, the watch-type terminal 400 transmits to the second external apparatus 620 an operation signal for operating the second external apparatus 620. The watch-type terminal 400 transmits the operation signal through a WiFi connection, for example.

According to an embodiment of the present embodiment, the user can store the obtained operation data in the external apparatus and operate the external apparatus at the desired time. Accordingly, although positioned a distance away from the external, the user can control the external apparatus at the desired time in the desired way.

Figure 8B:
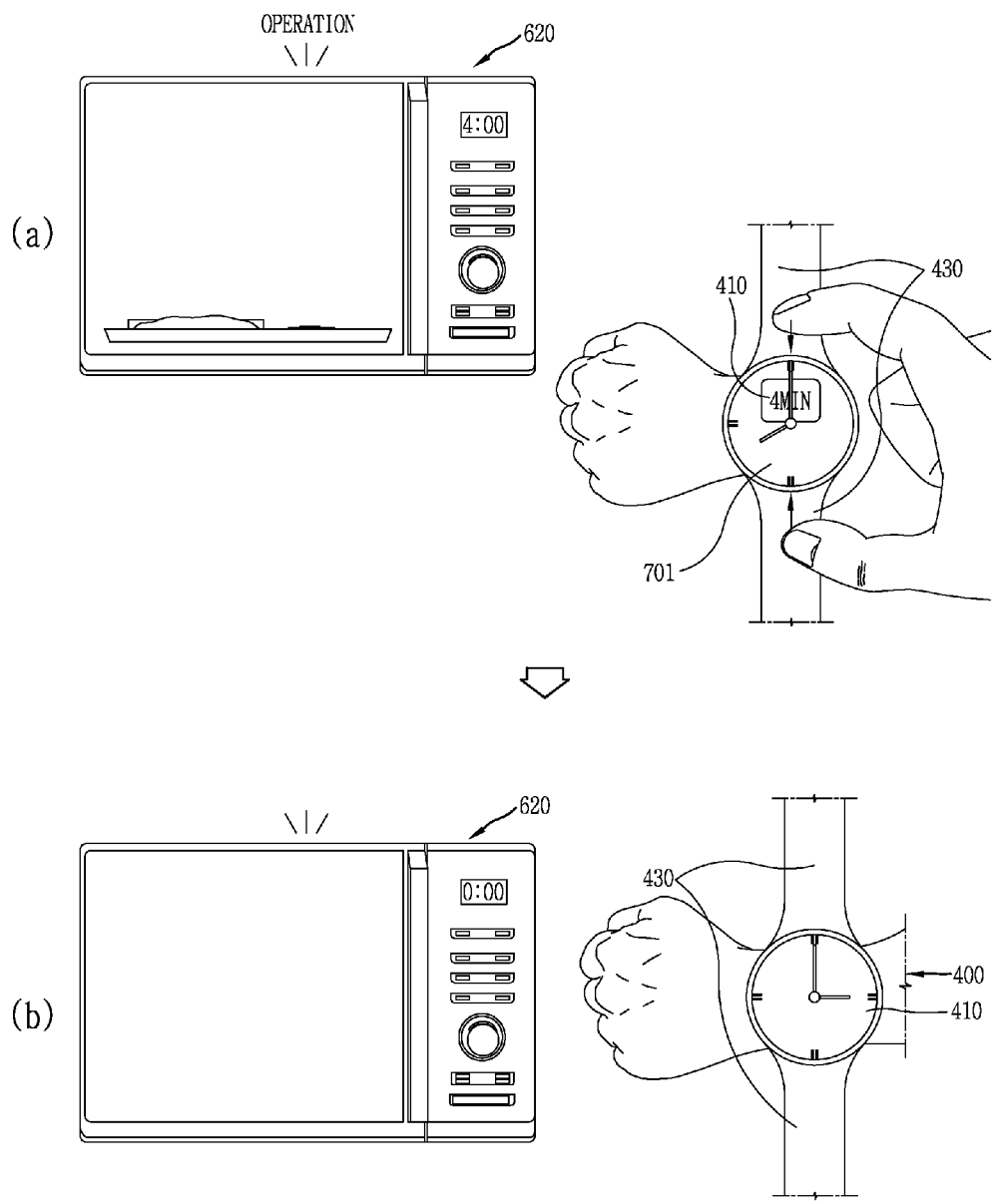

In additions, referring to FIG. 8B, operation of the second external apparatus 620 is limited based on the touch input applied to the second user input 430. When the watch-type terminal 400 is held in close proximity to the second external apparatus 620 and then the second external apparatus 620 operates, the progress information is output to the display unit 410.

When the touch input is received by the second user input 430, the watch-type terminal 400 limits the operation of the second external apparatus 620. Specifically, when the touch input that moves toward the display unit 410 is applied, the watch-type terminal 400 transmits an operation stopping signal to the second external apparatus 620. That is, even though the user cannot directly stop the operation status of the external apparatus, the user grasps the progress information and transmits the operation stopping signal control to control the external apparatus.

Figure 8C:
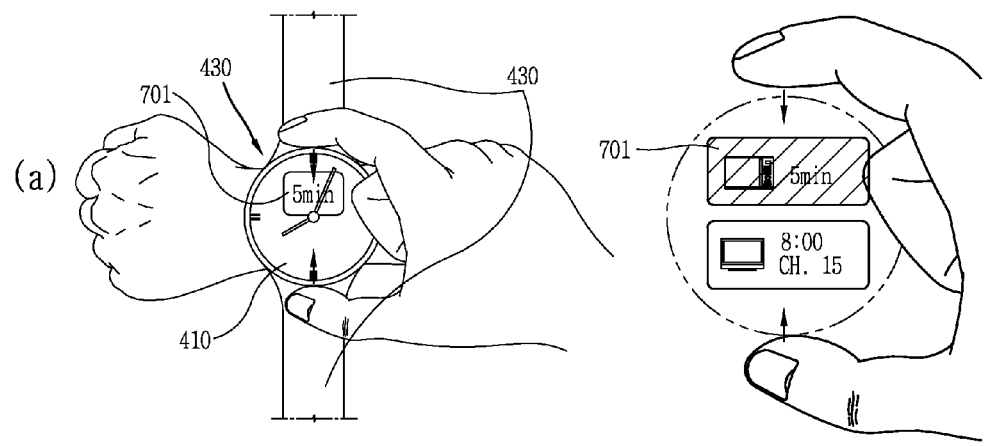
Figure 8C:
Figure 8C:
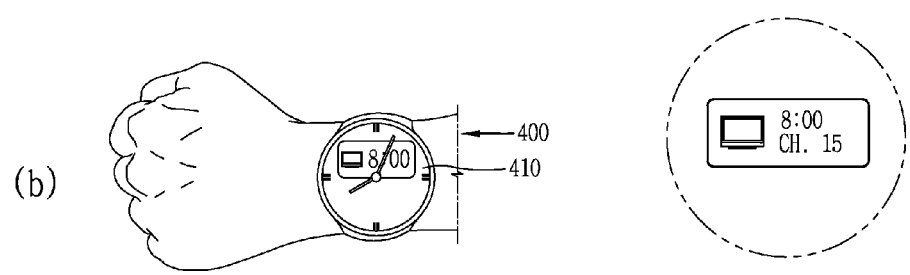

Referring to FIG. 8C(a) and (b), a control method is described in which if the multiple items of operation data are stored in the watch-type terminal the operation data is deleted using a third user input unit. If the multiple items of operation data are stored, the display unit 410 of the watch-type terminal 400 outputs at least one item of operation data among the multiple items of operation data.

In addition, if the multiple items of operation data, the external apparatus that the watch-type terminal 400 is held in close proximity to stores the operation data that is matched with the external apparatus, among the items of operation data that are received from the watch-type terminal 400.

If the multiple items of operation data 701 are output, when the touch input is applied to the third user input unit 430, the watch-type terminal 400 deletes one item of operation data. The touch input applied to the third user input unit 430 corresponds to the continuous touch input that is moved toward the display unit 410. For example, the items of operation data are deleted in the order in which they are stored, but the deletion order is not limited to this.

Figure 8D:
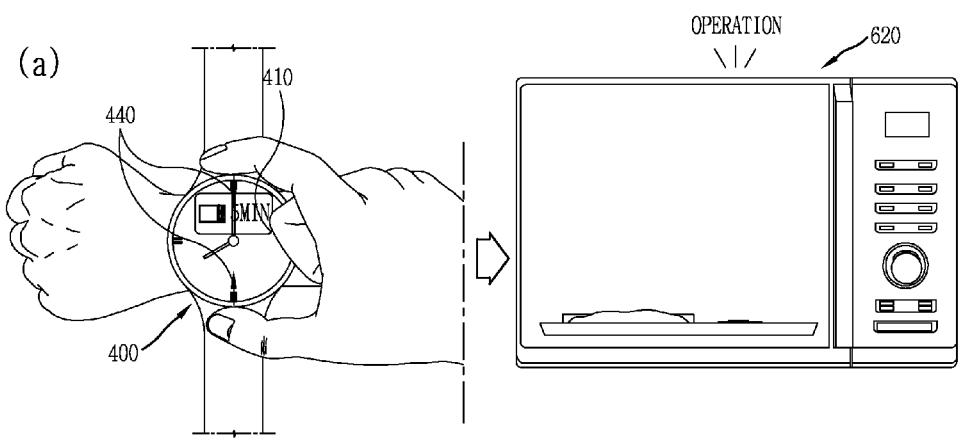
Figure 8D:
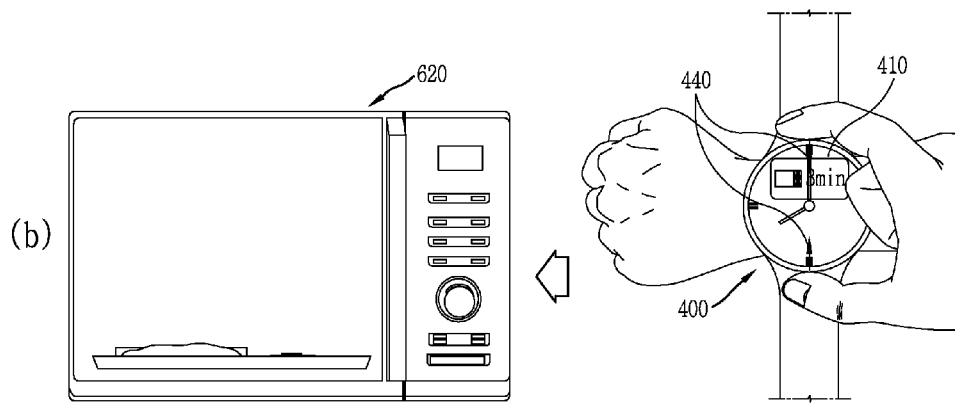

Referring to FIGS. 8D(a) and 8(b), a method is described in which the external apparatus is controlled based on the control command applied to the third user input unit 440. The housing of the watch-type terminal 400 according to the present embodiment includes a pressure application sensor (a squeeze sensor) that senses application of a pressure by the user.

When the watch-type terminal 400 in which the operation data is stored is held in close proximity to the external apparatus 620, when the control command is applied to the third user input unit 440, the watch-type terminal 400 transmits the operation signal to the external apparatus 620.

In addition, when the external apparatus 620 operates, and when the control command is applied to the third user input unit 440, the watch-type terminal 400 transmits the operation stopping signal to the external apparatus 620. That is, the user can transmit the signal that operates the external apparatus or stop operating the external apparatus, using the third user input unit 440.

Figure 9A:
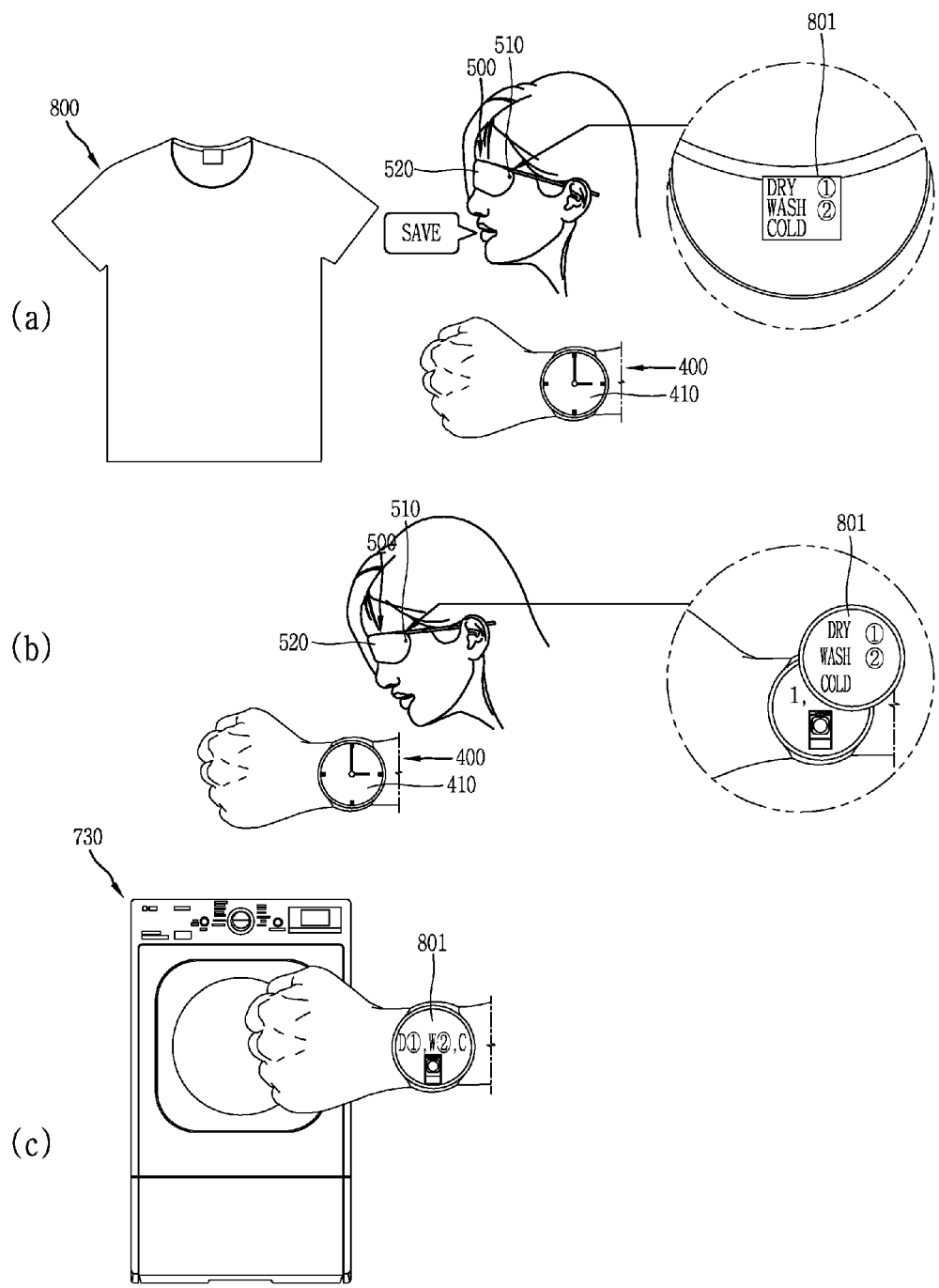
FIGS. 9A and 9B are diagrams illustrating a control method in which the external apparatus is controlled according to another embodiment.
Figure 9B:
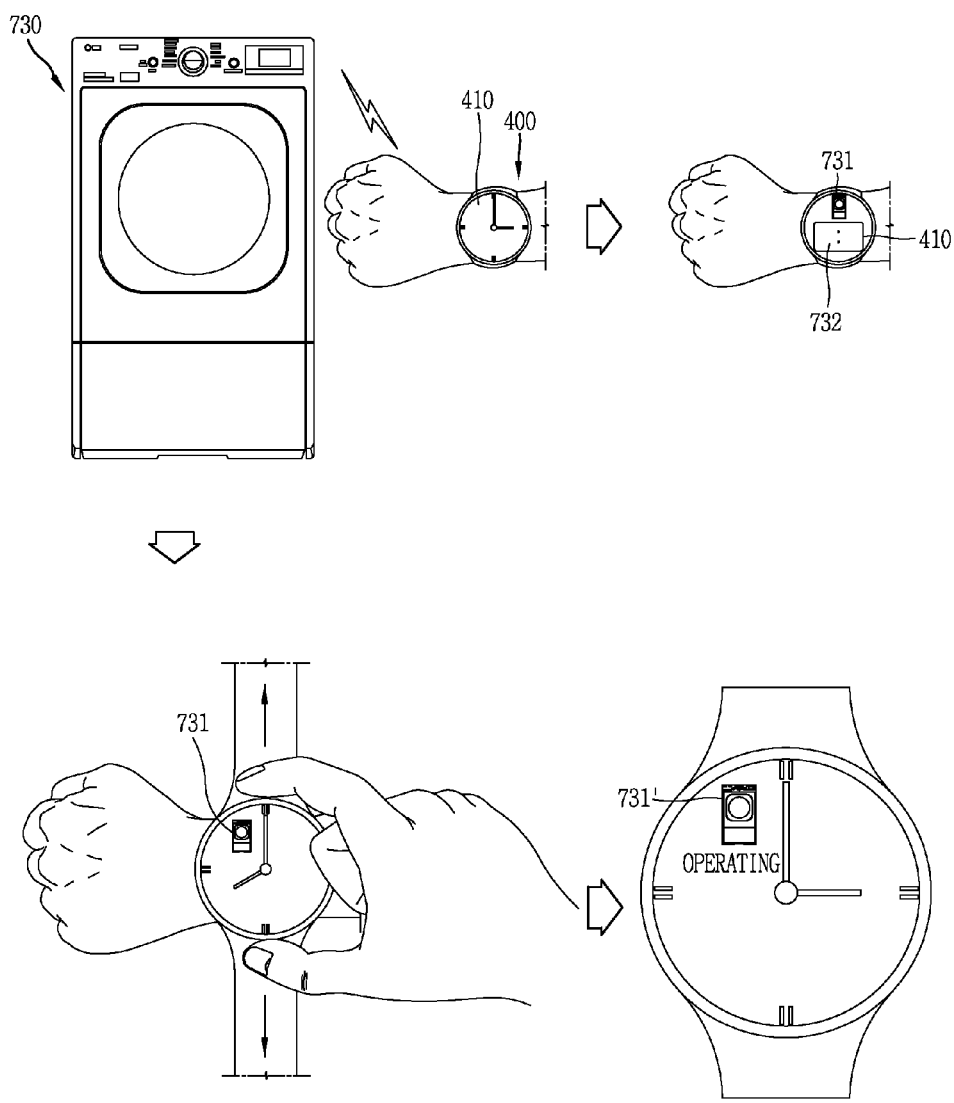

Next, FIGS. 9A and 9B are diagrams illustrating a control method in which the external apparatus is controlled according to another embodiment. Referring to FIGS. 9A(a) to 9A(c), the control method is described in which the external apparatus is controlled using information on an object that is to be applied to the external apparatus.

Further, the object that is to be applied to the external apparatus corresponds to, for example, an object that is distinguished from the external apparatus and that the external apparatus washes. For example, the object corresponds to laundry which the washing machine operates to wash.

When handling information 801 on an object 800 is detected by the camera 510 of the glasses-type terminal 500, the glasses-type terminal 500 stores the handling information 801. The handling information 801 is output to the display unit 520 of the glasses-type terminal 500. The handling information 801 includes information on the external apparatus that performs processing on the object.

That is, if the information on the external apparatus is included in information on an arbitrary object, the glasses-type terminal 500 extracts the information on the external apparatus from the information on the arbitrary object. When the watch-type terminal 400 is detected by the camera 510 of the glasses-type terminal 500, the handling information 801 is stored in the watch-type terminal 400.

When the watch-type terminal 400 storing the handling information is held in close proximity to a third external apparatus 730, the third external apparatus 730 receives the handling information 801 from the watch-type terminal 400. When data that is matched with the third external apparatus 730 is present in the handling information 801, the third external apparatus 730 operates bases on the handling information 801. That is, if the information on the external apparatus is included, there is no limit to a source from which to obtain information for controlling the external apparatus.

Referring to FIG. 9B, a control method is described in which the external apparatus operates using the watch-type terminal. If the watch-type terminal 400 in which the operation data is not stored is held in close proximity to an external apparatus 730, the watch-type terminal 400 obtains information on the external apparatus 730. In this instance, an image 731 indicating the external apparatus 730 is output to the display unit 410 of the watch-type terminal 400.

For example, an input window 732 is output to the display unit 410. The operation time for which the external apparatus 730 has to operate is input into the input window 732. In addition, the watch-type terminal 400 may further include a user input unit. The operation time or operation starting hour-and-minute may be input into the input window 732, based on the control command applied to the user input unit.

Further, after the operation data is set in the external apparatus 730, the watch-type terminal 400 is held in close proximity to the external apparatus 730. Also, in this instance, the image 731 is output to the display unit 410. The watch-type terminal 400 may further include a user input unit that receives the user's touch.

When a predetermined touch input is applied to the user input unit, the watch-type terminal 400 transmits to the external apparatus 730 the operation signal for controlling the operation of the external apparatus 730. That is, the external apparatus 730 is controlled after the information on the external apparatus 730 is first obtained.

The foregoing embodiments and advantages are merely and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a main body configured to be worn on a user's wrist;
   a display unit outputting screen information indicating current hour-and-minute;
   a wireless communication unit configured to wirelessly communicate with a glasses-type terminal worn by the user, said glasses-type terminal including a camera configured to capture an image including operational data for operating an external apparatus and information of a type of the external apparatus; and
   a controller configured to:
   receive the operational data from the glasses-type terminal and the information of the type of the external apparatus;
   store the operational data in a memory associated with the mobile terminal;
   display, on the display unit, an image indicating the external apparatus corresponding to the operational data and time information for which the external apparatus operates based on the received operational data;
   form a control signal based on the stored operational data, in response to a user input received by the mobile terminal;
   transmit the control signal to the external apparatus to control the external apparatus when the mobile terminal is held in close proximity to the external apparatus; and
   redisplay the screen information indicating the current hour-and-minute when the control signal is transmitted to the external apparatus,
   wherein while the display unit displays a plurality of operational data stored in the memory, the operation data matched to the external apparatus among the plurality of operational data is adjusted, when the mobile terminal is held in close proximity to the external apparatus.

2. The mobile terminal of claim 1, wherein the operational data includes time information indicating a time of operating the external apparatus.

3. The mobile terminal of claim 2, wherein the control signal transmitted to the external apparatus includes the time information so the external apparatus is operated according to the time information.

4. The mobile terminal of claim 3, wherein the time information includes baking time information and the external apparatus is an oven or microwave.

5. The mobile terminal of claim 3, wherein the time information includes a television program time and the external apparatus is a television.

6. The mobile terminal of claim 1, wherein the controller is further configured to store the operational data in the memory based on a preset command input by the user.

7. The mobile terminal of claim 1, wherein the external apparatus includes a home appliance.

8. The mobile terminal of claim 7, wherein the home appliance includes one of an oven, a microwave, a washing machine, a dryer and a television.

9. The mobile terminal of claim 1, wherein the image including operational data is displayed on the external apparatus or is displayed on a device different than the external apparatus.

10. The mobile terminal of claim 1, wherein the main body includes:
    a housing configured to support the display unit;
    a wrist band connected to the housing and configured to surround the user's wrist; and
    a user input unit configured to receive a control command associated with the external apparatus.

11. The mobile terminal of claim 10, wherein the user input unit is arranged in an edge of the housing and includes a wheel structure configured to be rotated, and
    wherein the controller is further configured to change the operational data based on the received control command.

12. The mobile terminal of claim 10, wherein the user input unit includes a touch sensing sensor configured to receive an input applied to at least one of the wrist band and the housing, and
    wherein the controller is further configured to transmit the control signal to the external apparatus based on the received input.

13. The mobile terminal of claim 12, wherein the control signal includes instructions for turning on or off the external apparatus or deleting the operational data associated with the mobile terminal.

14. The mobile terminal of claim 12, wherein the received input includes one of a touch and drag input on the wrist band and a squeezing of the housing.

15. The mobile terminal of claim 1, wherein the controller is further configured to display progress information of the external apparatus on the display unit.

16. The mobile terminal of claim 15, wherein the progress information includes an icon corresponding to the external apparatus and a remaining time for which the external apparatus is to operate.

17. The mobile terminal of claim 1, wherein the controller is further configured to detect the mobile terminal is within a predetermined communication distance from the external apparatus, and then transmit the control signal to the external apparatus.

18. A method of controlling a mobile terminal, the method comprising:
    outputting, via a display unit, screen information indicating current hour-and-minute;
    wirelessly communicating with a glasses-type terminal having a camera configured to capture an image including operational data for operating an external apparatus and information of a type of the external apparatus;

receiving the operational data from the glasses-type terminal and the formation of the type of the external apparatus;

storing the operational data in a memory associated with the mobile terminal;

displaying an image indicating the external apparatus corresponding to the operational data and time information for which the external apparatus operates based on the received operational data;

forming a control signal based on the stored operational data, in response to a user input received by the mobile terminal;

transmitting the control signal to the external apparatus to control the external apparatus when the mobile terminal is held in close proximity to the external apparatus; and redisplaying the screen information indicating the current hour-and-minute the control signal is transmitted to the external apparatus, wherein while the display unit displays a plurality of operational data stored in the memory, the operation data matched to the external apparatus among the plurality of operational data is adjusted, when the mobile terminal is held in close proximity to the external apparatus.

19. The method of claim 18, wherein the operational data is displayed on the display unit of the glasses-type terminal.

* * * * *